(12) United States Patent
Redding et al.

(10) Patent No.: US 11,986,884 B2
(45) Date of Patent: May 21, 2024

(54) APPARATUS AND METHOD FOR ADDITIVE MANUFACTURING

(71) Applicant: General Electric Company, Schenectady, NY (US)

(72) Inventors: MacKenzie Ryan Redding, Mason, OH (US); Andrew David Simpson, Fort Thomas, KY (US); Justin Mamrak, Loveland, OH (US)

(73) Assignee: General Electric Company, Schenectady, NY (US)

( * ) Notice: Subject to any disclaimer, the term of this patent is extended or adjusted under 35 U.S.C. 154(b) by 208 days.

(21) Appl. No.: 16/761,717

(22) PCT Filed: Nov. 2, 2018

(86) PCT No.: PCT/US2018/058927
§ 371 (c)(1),
(2) Date: May 5, 2020

(87) PCT Pub. No.: WO2019/094294
PCT Pub. Date: May 16, 2019

(65) Prior Publication Data
US 2021/0370394 A1    Dec. 2, 2021

Related U.S. Application Data

(60) Provisional application No. 62/584,188, filed on Nov. 10, 2017.

(51) Int. Cl.
*B22F 5/00* (2006.01)
*B22F 5/10* (2006.01)
(Continued)

(52) U.S. Cl.
CPC .............. *B22F 5/009* (2013.01); *B22F 5/106* (2013.01); *B22F 10/28* (2021.01); *B22F 10/50* (2021.01);
(Continued)

(58) Field of Classification Search
CPC .......... B22F 5/106; B22F 5/009; B22F 10/28; B22F 10/40; B22F 10/50; B22F 12/37;
(Continued)

(56) References Cited

U.S. PATENT DOCUMENTS

2013/0197683 A1* 8/2013 Zhang ................ B23K 35/3066
700/96

FOREIGN PATENT DOCUMENTS

DE    102016111047 B3 * 10/2017    ............... B21H 1/06
DE    102016111047 B3    10/2017

OTHER PUBLICATIONS

PCT International Search Report Corresponding to PCT/US2018/058927 dated Jan. 22, 2019.

* cited by examiner

*Primary Examiner* — Anthony M Liang
*Assistant Examiner* — Danny N Kang
(74) *Attorney, Agent, or Firm* — Dority & Manning, P.A.

(57) ABSTRACT

Additive manufacturing apparatus, along with methods of forming an object therewith, are provided. The additive manufacturing apparatus may include at least one build unit; a build platform (such as a rotating build platform); and a pair of collectors positioned on the apparatus such that a first collector contacts an outer surface of an object as it is formed on the build platform and a second collector contacts an inner surface of the object as it is formed on the build platform.

12 Claims, 5 Drawing Sheets

(51) Int. Cl.
*B22F 10/28* (2021.01)
*B22F 10/50* (2021.01)
*B22F 12/00* (2021.01)
*B22F 12/37* (2021.01)
*B33Y 10/00* (2015.01)
*B33Y 30/00* (2015.01)
*B22F 10/73* (2021.01)
*B22F 12/70* (2021.01)

(52) U.S. Cl.
CPC .............. *B22F 12/22* (2021.01); *B22F 12/37* (2021.01); *B22F 10/73* (2021.01); *B22F 12/70* (2021.01); *B33Y 10/00* (2014.12); *B33Y 30/00* (2014.12)

(58) Field of Classification Search
CPC ......... B22F 10/20; B33Y 10/00; B33Y 30/00; Y02P 10/25; B29C 64/205
See application file for complete search history.

APPARATUS AND METHOD FOR ADDITIVE MANUFACTURING

PRIORITY INFORMATION

The present application claims priority to U.S. Provisional Application Ser. No. 62/584,188 filed on Nov. 10, 2017, which is incorporated by reference herein.

FIELD

The present disclosure generally relates to methods and systems adapted to perform additive manufacturing ("AM") processes, for example by direct melt laser manufacturing ("DMLM"), on a larger scale format.

BACKGROUND

Additive manufacturing ("AM") processes generally involve the buildup of one or more materials to make a net or near net shape (NNS) object, in contrast to subtractive manufacturing methods. Though "additive manufacturing" is an industry standard term (ISO/ASTM52900), AM encompasses various manufacturing and prototyping techniques known under a variety of names, including freeform fabrication, 3D printing, rapid prototyping/tooling, etc. AM techniques are capable of fabricating complex components from a wide variety of materials. Generally, a freestanding object can be fabricated from a computer aided design (CAD) model. A particular type of AM process uses an irradiation emission directing device that directs an energy beam, for example, an electron beam or a laser beam, to sinter or melt a powder material, creating a solid three-dimensional object in which particles of the powder material are bonded together. Different material systems, for example, engineering plastics, thermoplastic elastomers, metals, and ceramics are in use. Laser sintering or melting is a notable AM process for rapid fabrication of functional prototypes and tools. Applications include direct manufacturing of complex workpieces, patterns for investment casting, metal molds for injection molding and die casting, and molds and cores for sand casting. Fabrication of prototype objects to enhance communication and testing of concepts during the design cycle are other common usages of AM processes.

Selective laser sintering, direct laser sintering, selective laser melting, and direct laser melting are common industry terms used to refer to producing three-dimensional (3D) objects by using a laser beam to sinter or melt a fine powder. More accurately, sintering entails fusing (agglomerating) particles of a powder at a temperature below the melting point of the powder material, whereas melting entails fully melting particles of a powder to form a solid homogeneous mass. The physical processes associated with laser sintering or laser melting include heat transfer to a powder material and then either sintering or melting the powder material. Although the laser sintering and melting processes can be applied to a broad range of powder materials, the scientific and technical aspects of the production route, for example, sintering or melting rate and the effects of processing parameters on the microstructural evolution during the layer manufacturing process have not been well understood. This method of fabrication is accompanied by multiple modes of heat, mass and momentum transfer, and chemical reactions that make the process very complex.

During direct metal laser sintering ("DMLS") or direct metal laser melting (DMLM), an apparatus builds objects in a layer-by-layer manner by sintering or melting a powder material using an energy beam. The powder to be melted by the energy beam is spread evenly over a powder bed on a build platform, and the energy beam sinters or melts a cross sectional layer of the object being built under control of an irradiation emission directing device. The build platform is lowered and another layer of powder is spread over the powder bed and object being built, followed by successive melting/sintering of the powder. The process is repeated until the part is completely built up from the melted/sintered powder material.

After fabrication of the part is complete, various post-processing procedures may be applied to the part. Post processing procedures include removal of excess powder by, for example, blowing or vacuuming. Other post processing procedures include a stress release process. Additionally, thermal and chemical post processing procedures can be used to finish the part.

In conventional systems, the walls of the powder bed define the amount of powder needed to make a part. However, the size of object to be built is limited by the size of the machine's powder bed. Increasing the size of the powder bed has limits due to the needed large angle of incidence that can lower scan quality, and weight of the powder bed which can exceed the capabilities of steppers used to lower the build platform. In view of the foregoing, there remains a need for manufacturing apparatuses and methods that can handle production of large objects with improved precision and in a manner that is both time- and cost-efficient with a minimal waste of raw materials.

BRIEF DESCRIPTION

Aspects and advantages will be set forth in part in the following description, or may be obvious from the description, or may be learned through practice of the invention.

Additive manufacturing apparatus is generally provided, along with methods of forming an object therewith. In one embodiment, the additive manufacturing apparatus includes at least one build unit; a build platform (e.g., a rotating build platform); and a pair of collectors positioned on the apparatus such that a first collector contacts an outer surface of an object as it is formed on the build platform and a second collector contacts an inner surface of the object as it is formed on the build platform.

In one embodiment, the method of manufacturing an object may include: (a) depositing powder onto a build platform from at least one build unit; (b) bonding at least one selected portion of the powder to form an object having an outer surface and an inner surface; (c) positioning an outer collector on the outer surface of the object and positioning an inner collector on the inner surface of the object; and (d) repeating at least steps (a) through (c) to form the object on the build platform. In particular embodiments, the method may include rotating the build platform during at least part of the build (e.g., during at least steps (a) through (c)).

These and other features, aspects and advantages will become better understood with reference to the following description and appended claims. The accompanying drawings, which are incorporated in and constitute a part of this specification, illustrate embodiments of the invention and, together with the description, serve to explain certain principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended Figs., in which.

Figure 1:
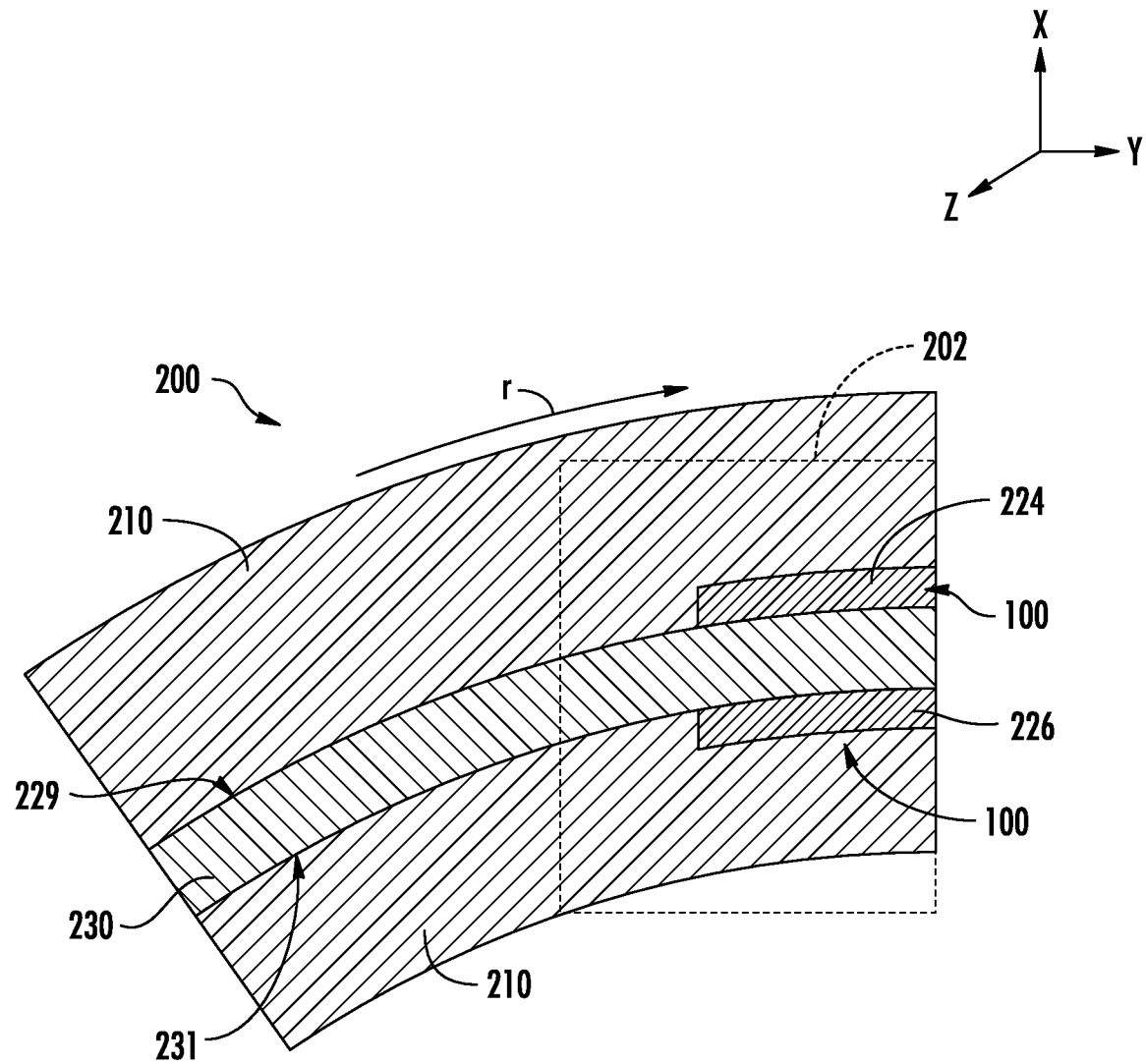
FIG. 1 is a top view showing an additive manufacturing print strategy in accordance with an embodiment of the invention.

Repeat use of reference characters in the present specification and drawings is intended to represent the same or analogous features or elements of the present invention.

DETAILED DESCRIPTION OF PARTICULAR EMBODIMENTS

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first", "second", and "third" may be used interchangeably to distinguish one component from another and are not intended to signify location or importance of the individual components.

Methods and apparatus are generally provided for additively manufacturing certain components of metal objects. In particular embodiments, methods and apparatus can be used to perform powder-based additive layer manufacturing of a large object, particularly large, annular components (e.g., annular components of turbomachinery). Examples of powder-based additive layer manufacturing include but are not limited to selective laser sintering (SLS), selective laser melting (SLM), direct metal laser sintering (DMLS), direct metal laser melting (DMLM), binder jetting, and electron beam melting (EBM) processes. Although described below with respect to additive manufacturing apparatus that include a rotating build platform, the present teachings also apply to objects formed on stationary build platforms.

In one embodiment, an additive manufacturing apparatus provided herein includes a mobile build unit assembly, which is configured to include several components that are essential for additively manufacturing high-precision, large-scale objects. These build components include, for example, a powder recoating mechanism and a bonding mechanism (e.g., an irradiation beam directing mechanism, a binder jetting apparatus, etc.). The build unit is advantageously attached to a positioning mechanism that allows two- or three-dimensional movement (along x-, y- and z-axes) throughout the build environment, as well as rotation of the build unit in a way that allows leveling of the powder in any direction desired. The positioning mechanism may be a gantry, a delta robot, a cable robot, a robotic arm, a belt drive, or the like.

Aside from the mobile build unit, one embodiment of the additive manufacturing apparatus also includes a rotating build platform. Preferably, this build platform has a substantially circular configuration, but is not so limited. Since the build unit of the apparatus is mobile, this eliminates the need to lower the build platform as successive layers of powder are built up, as it is in conventional powder bed systems. Accordingly, the rotating platform of the present invention is preferably vertically stationary.

Since there are two mobile components in the additive manufacturing apparatuses of the present invention, namely the build unit and the build platform, it is important to coordinate, for example, the speed and/or direction of the irradiation beam directing mechanism with, for example, the rotational speed and/or rotational direction of the build platform. FIG. 1 shows a top view of the apparatus 200 having a mobile build unit 202 and a rotating build platform 210. The rotational direction of the build platform 210 is shown with reference to the curved arrow "r". The build unit 202, which includes an irradiation beam directing mechanism (not shown), may be translated along the x-, y- or z-axis as indicated by the linear arrows. FIG. 1 also shows a built object 230 that is formed on the build platform 210 between a pair of collectors 100 (e.g., an outer collector 224 and an inner collector 226 in the embodiment shown). In the embodiment shown, the outer collector 224 contacts the outer surface 229 of the built object 230, and the inner collector 226 contacts the inner surface 231 of the built object 230.

Figure 2:
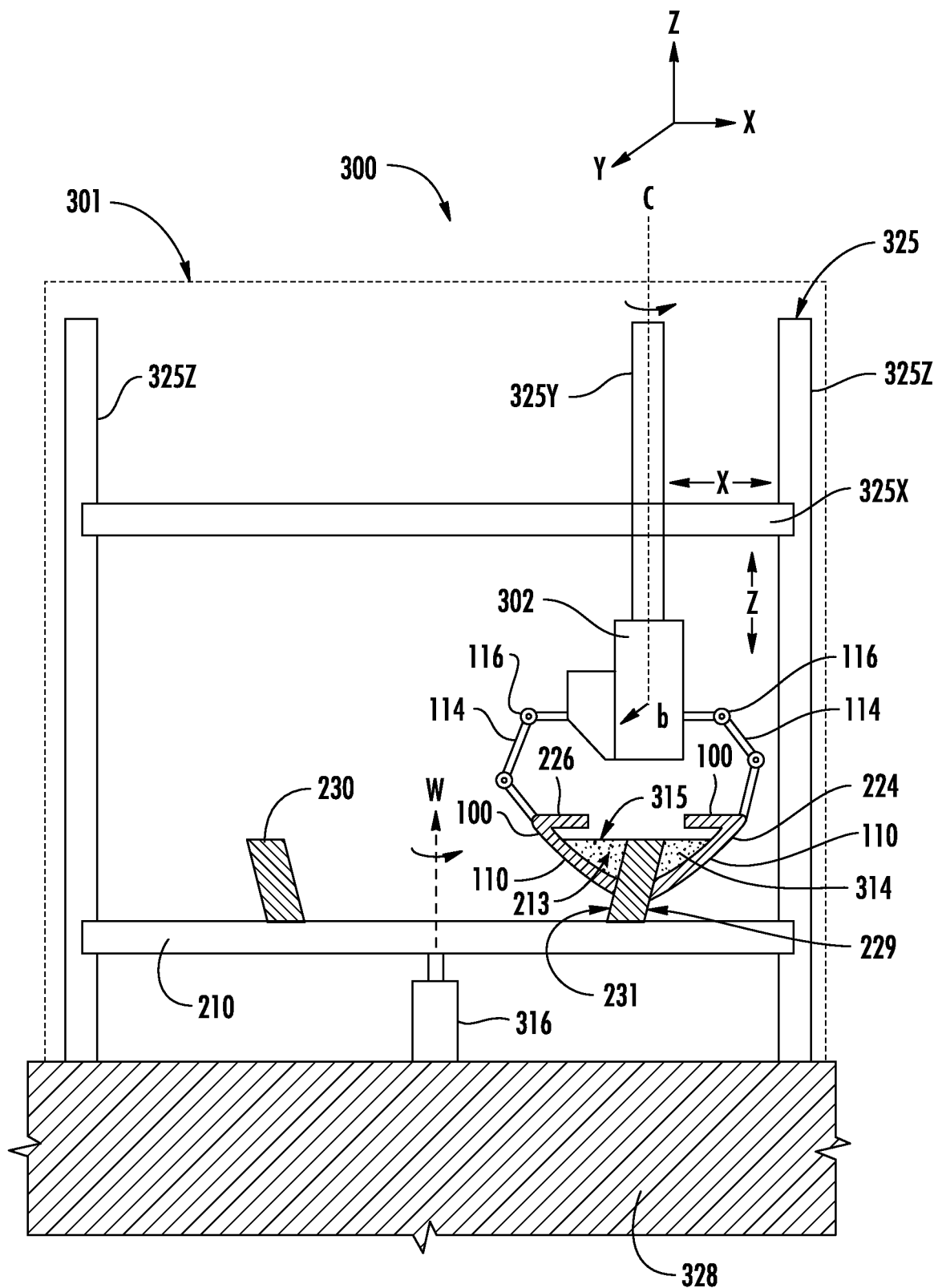
FIG. 2 is a schematic diagram showing a front view showing a cross section of an additive manufacturing apparatus according an embodiment of the invention.

As more particularly shown in the cross-sectional view of FIG. 2, the collectors 224, 226 hold loose powder 314 against the outer surface 229 and inner surface 231 during a build process. In the embodiment shown, the collectors 100 utilize their collector arms 110 to form a powder bed 314 of loose powder on the outside of the inner and outer surfaces 229, 231. As such, the build envelopes and/or build walls are not required to build the object 230. In certain embodiments, the outer surface 229 and inner surface 231 are exposed below the area where the collectors 224, 226 make contact therewith, respectively. Thus, the loose powder 315 may be held at the top of the build object 230 during the solidifying the object 230.

Figure 5:
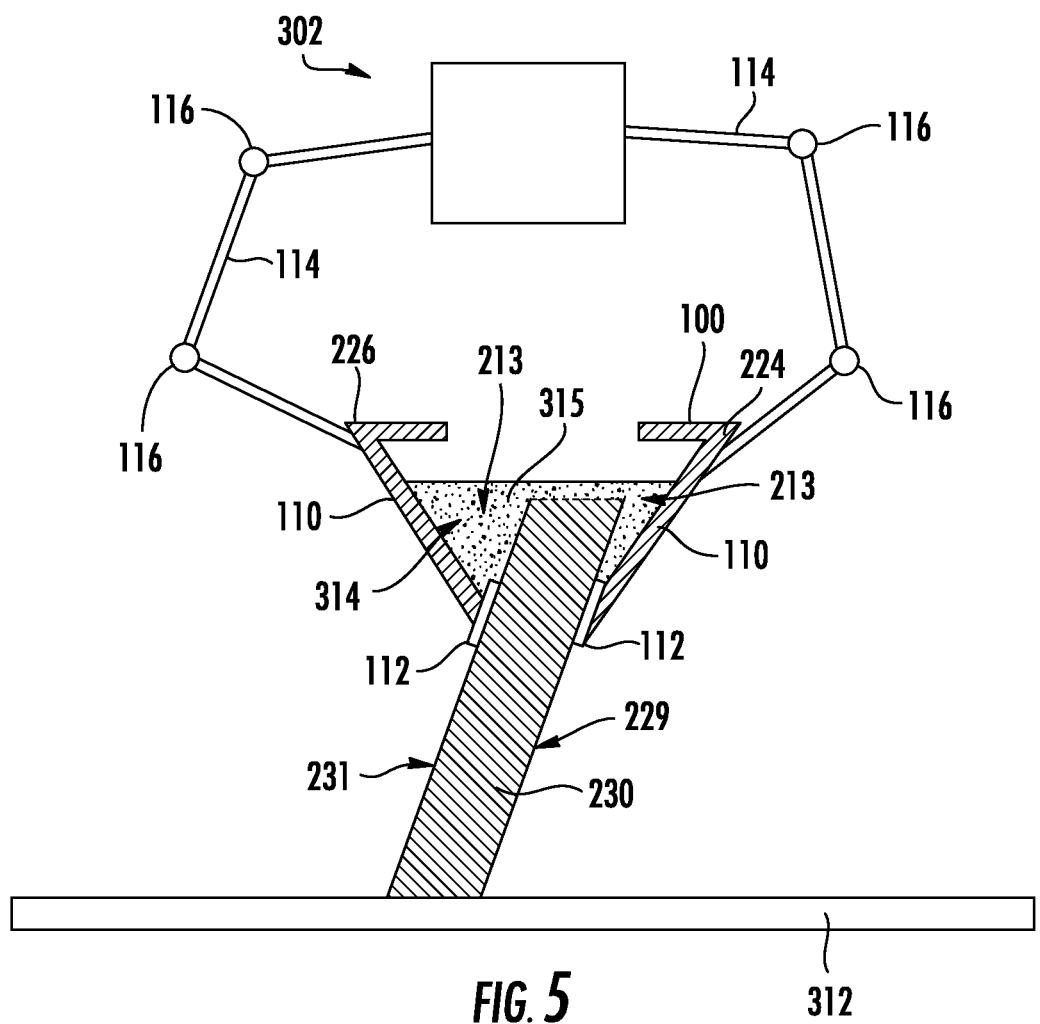
FIG. 5 shows an exemplary cross-sectional view of a build unit during an object build between a pair of collectors over a build platform.

Referring to FIGS. 2 and 5, the outer collector 224 and inner collector 226 are shown positioned adjacent to the exterior surfaces 229, 231 of the object 230, respectively. Each collector 224, 226 includes a collection arm 110 contacting the outer surface 229, 231 to form a powder cavity 213 therebetween. Referring to FIG. 5, for example, a sealing member 112 may be on the end of each collection arm 110 such that the contact therebetween may hold the powder within the powder cavity 213 without allowing any substantial leakage therebetween.

In particular embodiments, the outer collectors 224 and inner collectors 226 are pivotally attached to the build unit 302 (e.g., to the powder dispenser 512). For example, support members 114 may connect the outer collectors 224 and inner collectors 226 to the build unit 302. The support members 114 may also include one or more pivot joint 116 configured to maintain contact between the outer collectors 224 and inner collectors 226 and the exterior surfaces 229, 231 of the object 230, respectively. The pivot joints 116 may allow for the collectors 224, 226 to be biased toward the object 230 such that sufficient contact is kept therebetween to inhibit leakage, even as the build unit 302 is moved about the apparatus. For example, the pivot joint can be controlled with the movement of the build unit 302. In other embodiments, support members 114 may be attached to the positioning mechanism 325 (e.g., the z-crossbeams 325Z or the x-crossbeams 325X).

FIG. 2 further depicts a schematic representation of an additive manufacturing apparatus 300 according to one embodiment of the present invention. The apparatus 300 may include a build enclosure 301 housing the entire apparatus 300 and object 230 to be built. The apparatus 300 includes a build unit 302 and a rotating build platform 310. During operation, the apparatus builds an object 230 in a powder bed 314 formed between the outer collector 224 and the inner collector 226. Preferably, the object 230 is a large annular object, such as, but not limited to, a turbine or vane shrouding, a central engine shaft, a casing, a compressor liner, a combustor liner, a duct, etc.

Figure 4:
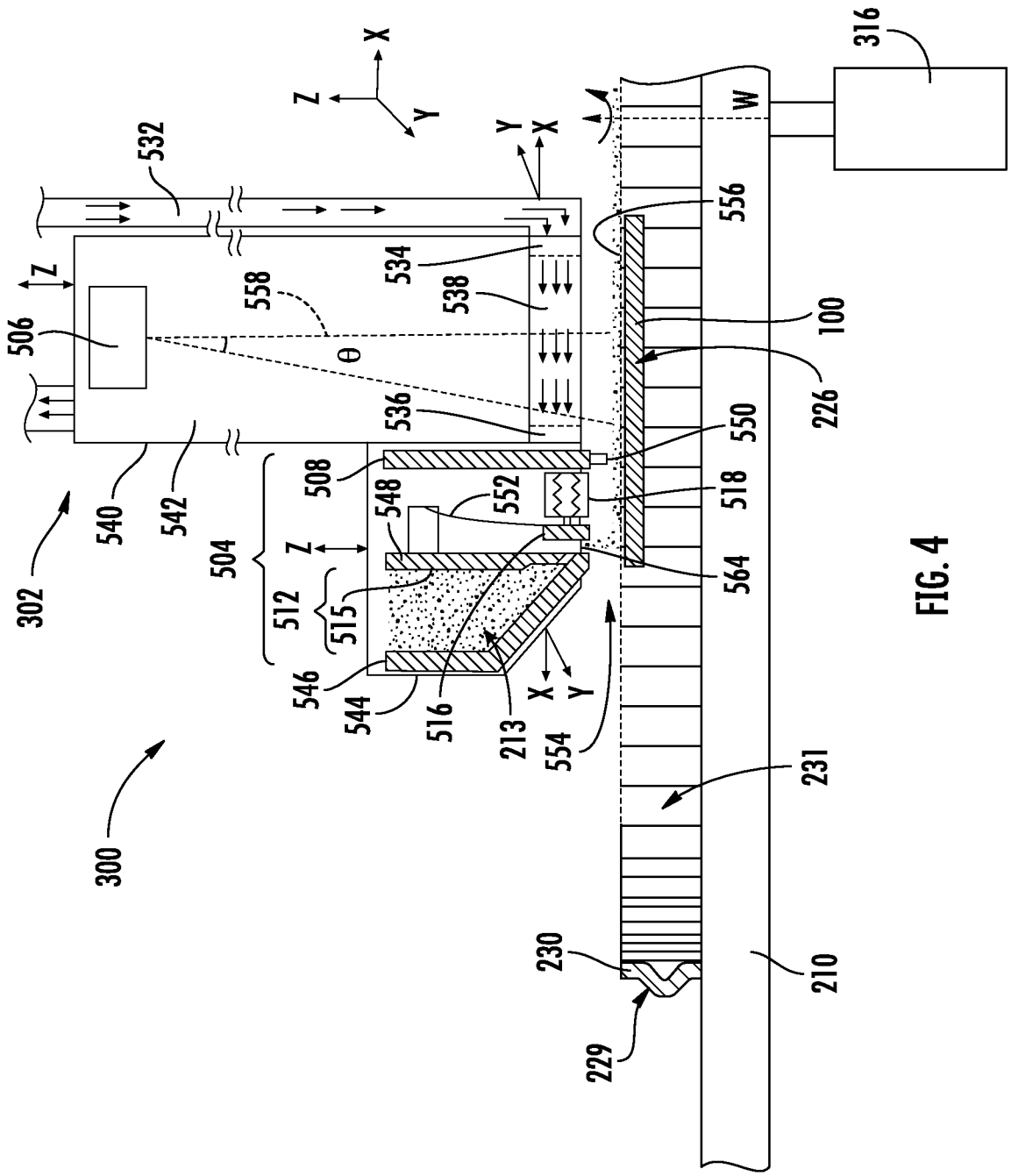
FIG. 4 is an expanded cross section of a build unit and part of the rotating build platform of the additive manufacturing apparatus of FIG. 3.

The build unit 302 may be configured to include several components for additively manufacturing a high-precision, large-scale object or multiple smaller objects. A mobile build unit may include, for example, a powder delivery mechanism, a powder recoating mechanism, a gas-flow mechanism with a gas-flow zone and an irradiation beam directing mechanism. FIG. 4 includes additional details of an exemplary mobile build unit to be used in accordance with particular embodiments of the present invention.

Figure 3:
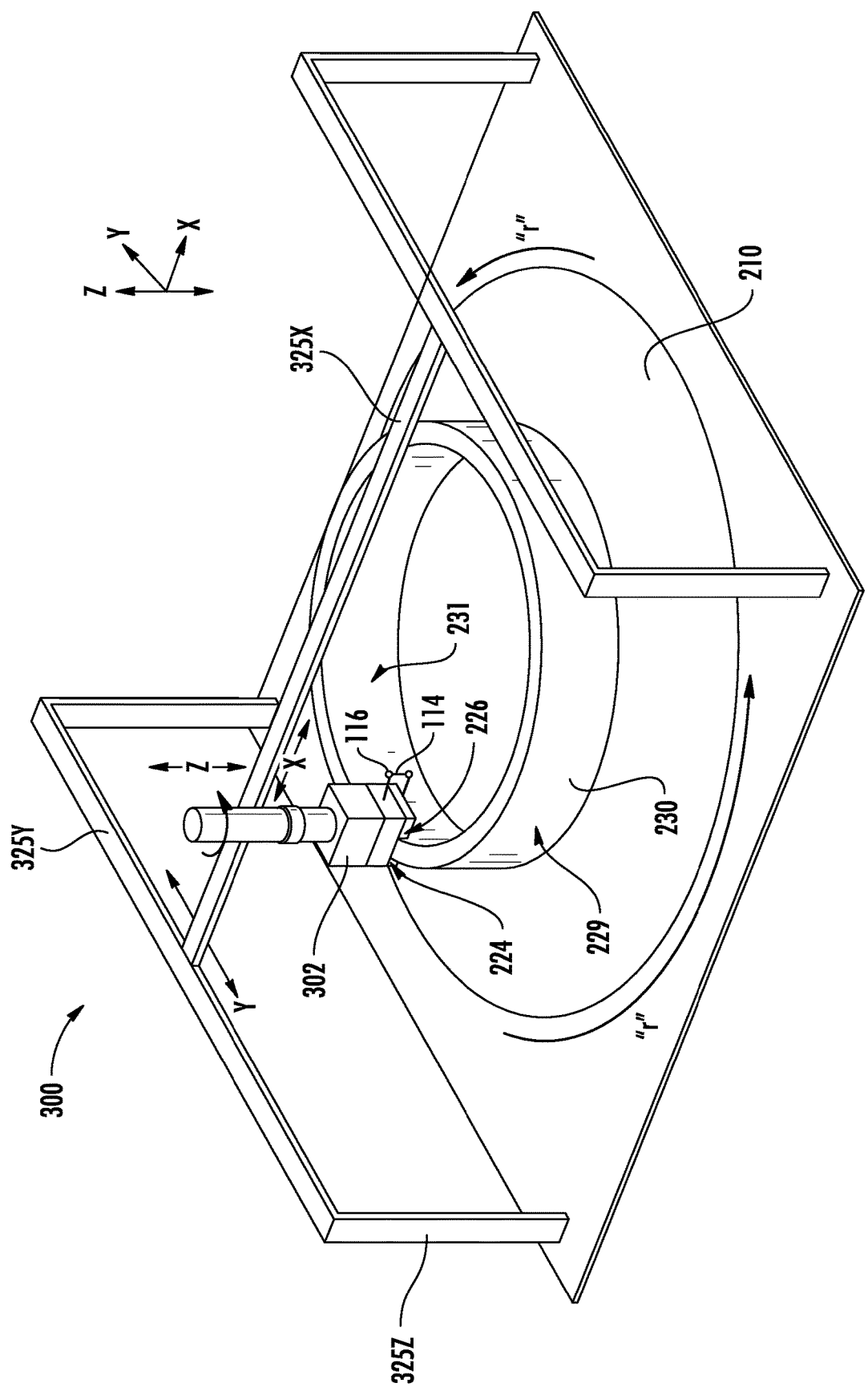
FIG. 3 is a perspective view of an additive manufacturing apparatus in accordance with an embodiment of the invention.

The positioning mechanism 325 may be an X-Y-Z gantry has one or more x-crossbeams 325X (e.g., as shown in FIGS. 2 and 3) that independently move the build unit 302 along the x-axis (i.e., left or right), one or more y-crossbeams 325Y that respectively move the build unit 302 along the y-axis (i.e. inward or outward). Such two-dimensional movements across the x-y plane are substantially parallel to the build platform 210 or a build area therewithin. Additionally, the positioning mechanism 325 has one or more z-crossbeams 325Z (two shown in FIG. 2) that moves the build unit 302 along the z-axis (i.e. upward and downward or substantially perpendicular to the build platform 310 or a build area therewithin). The positioning mechanism 325 is further operable to rotate the build unit 302 around the c-axis and also the b-axis.

The rotating build platform 210 may be a rigid and ring-shaped or annular structure (i.e. with an inner central hole) configured to rotate 360° around the center of rotation W. The rotating build platform 210 may be secured to an end mount of a motor 316 that is operable to selectively rotate the rotating build platform 210 around the center of rotation W such that the build platform 210 moves in a circular path. The motor 316 may be further secured to a stationary support structure 328. The motor may also be located elsewhere near the apparatus and mechanically connected with the build platform via a belt for translating motion of the motor to the build platform.

In the embodiment of FIG. 2, outer collector 224 and inner collector 226 are positioned to remain adjacent to the outer surface 229 and the inner surface 231, respectively. Generally, the outer collectors 224 and inner collectors 226 temporarily trap powder along the outside of the outer wall 229 and the inner wall 231, respectively. While the powder is trapped by the collectors 224, 226, the energy source is used to melt the powder forming the object 230, such that its outer and inner surfaces 229, 231 are formed with powder is on either side. As such, the collectors 100 may inhibit break down effects that are sometimes observed without powder on the external side of the built object 230.

In particular embodiments, the excess powder on the exterior of the surfaces 229, 231 may then fall away to the outside of the part and be collected at a later time. Alternatively, a trailing vacuum could travel with head for immediate collection, and may be returned to the powder dispenser 512 itself.

FIG. 3 shows an additive manufacturing apparatus 300 in accordance with another aspect of the present invention. The build unit 302 is attached to a gantry having "z" crossbeams 325Y, "x" crossbeam 325X and "y" crossbeam 325Y (partially shown). The build unit 302 can be rotated in the x-y plane as well as the z-plane as shown by the curved arrows in FIG. 3. The object being built 230 on the rotating build platform 210 has the powder bed (not shown) constrained by the outer collector 224 and an inner collector 226.

FIG. 4 shows a side view of a manufacturing apparatus 300 including details of the build unit 302, which is pictured on the far side of the build platform. The mobile build unit 302 includes an irradiation beam directing mechanism 506, a gas-flow mechanism 532 with a gas inlet 534 and gas outlet 536 providing gas flow to a gas flow zone 538, and a powder recoating mechanism 504. Above the gas flow zone 538, there is an enclosure 540 that contains an inert environment 542. The powder recoating mechanism 504, which is mounted on a recoater plate 544, has a powder dispenser 512 that includes a back plate 546 and a front plate 548. The powder recoating mechanism 504 also includes at least one actuating element 552, at least one gate plate 516, a recoater blade 550, an actuator 518 and a recoater arm 508. In this embodiment, the actuator 518 activates the actuating element 552 to pull the gate plate 516 away from the front plate 548, as shown in FIG. 4. There is also a gap 564 between the front plate 548 and the gate plate 516 that allows the powder to flow onto the rotating build platform 210 when the gate plate 516 is pulled away from the front plate 548 by the actuating element 552.

FIG. 4 shows the build unit 302 with the gate plate 516 at an open position. The powder 515 in the powder dispenser 512 is deposited to make a fresh layer of powder 554, which is smoothed over a portion of the top surface (i.e. build or work surface) of the object 230 and within the powder cavity 213. For example, the recoater blade 510 to make a substantially even powder layer 556 which is then irradiated by the irradiation beam 558 to a fused layer that is part of the printed object 230. In some embodiments, the substantially even powder layer 556 may be irradiated at the same time as the build unit 302 is moving, which allows for a continuous operation of the build unit 302 and hence, a more time-efficient production of the printed or grown object 230.

The selective powder recoating mechanism 504 may have a powder dispenser 512 with only a single compartment containing a raw material powder 515, though multiple compartments containing multiple different material powders are also possible. Multiple gate plates 516 may be utilized and independently controlled by the respective actuators 518.

Advantageously, a selective recoating mechanism according to an embodiment of the present invention allows precise control of powder deposition using powder deposition device (e.g. a hopper) with independently controllable powder gate plates 516. The powder gate plates are controlled by at least one actuating element which may be, for instance, a bi-directional valve or a spring. Each powder gate can be opened and closed for particular periods of time, in particular patterns, to finely control the location and quantity of powder deposition. The powder dispenser 512 may contain dividing walls so that it contains multiple chambers, each chamber corresponding to a powder gate, and each chamber containing a particular powder material. The powder materials in the separate chambers may be the same, or they may be different. Advantageously, each powder gate can be made relatively small so that control over the powder deposition is as fine as possible. Each powder gate has a width that may be, for example, no greater than about 2 inches (in), or more preferably no greater than about ¼ in. In general, the smaller the powder gate, the greater the powder deposition resolution, and there is no particular lower limit on the width of the powder gate. The sum of the widths of all powder gates may be smaller than the largest width of the object, and there is no particular upper limit on the width of the object relative to the sum of the widths of the power gates. Advantageously, a simple on/off powder gate mechanism according to an embodiment of the present invention is simpler and thus less prone to malfunctioning. It also advantageously permits the powder to come into contact with fewer parts, which reduces the possibility of contamination.

Although the additive manufacturing apparatus 300 is shown having a single build unit 302, multiple build units may be utilized in accordance with certain embodiments. Each build unit 302 may have the associated collectors 100 attached thereto, along with associated positioning mechanisms 325.

Representative examples of suitable powder materials can include metallic alloy, polymer, or ceramic powders. Exemplary metallic powder materials are stainless steel alloys, cobalt-chrome, aluminum alloys, titanium alloys, nickel based superalloys, and cobalt based superalloys. In addition, suitable alloys may include those that have been engineered to have good oxidation resistance, known "superalloys" which have acceptable strength at the elevated temperatures of operation in a gas turbine engine, e.g. Hastelloy, Inconel alloys (e.g., IN 738, IN 792, IN 939), Rene alloys (e.g., Rene N4, Rene N5, Rene 80, Rene 142, Rene 195), Haynes alloys, Mar M, CM 247, CM 247 LC, C263, 718, X-750, ECY 768, 282, X45, PWA 1483 and CMSX (e.g. CMSX-4) single crystal alloys. The manufactured objects of the present invention may be formed with one or more selected crystalline microstructures, such as directionally solidified ("DS") or single-crystal ("SX").

This written description uses exemplary embodiments to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An additive manufacturing apparatus, comprising:
   at least one build unit;
   a build platform;
   a pair of collectors positioned on the additive manufacturing apparatus such that a first collector contacts an outer surface of an object as it is formed on the build platform and a second collector contacts an inner surface of the object as it is formed on the build platform, wherein the object is formed in a powder bed disposed between the first collector and the second collector, and wherein the first collector and the second collector define a powder cavity and simultaneously hold powder from the powder bed against the outer surface and the inner surface of the object during a build process, wherein the first collector comprises a first collection arm; and
   a first sealing member on an end of the first collection arm such that the contact between the first sealing member and the outer surface of the object holds the powder within the powder cavity.

2. The additive manufacturing apparatus of claim 1, wherein the build platform is a rotating build platform.

3. The additive manufacturing apparatus of claim 1, wherein the second collector comprises a second collection arm.

4. The additive manufacturing apparatus of claim 3, further comprising a second sealing member on an end of the second collection arm such that the contact between the second sealing member and the inner surface of the object holds the powder within the powder cavity.

5. The additive manufacturing apparatus of claim 1, wherein the first collector is attached to the build unit via a support member, and wherein the support member includes a pivot joint that is biased to keep the first collector in contact with the outer surface of the object.

6. The additive manufacturing apparatus of claim 1, wherein at least one of the pair of collectors is attached to a positioning mechanism via a support member.

7. The additive manufacturing apparatus of claim 1, wherein the at least one build unit comprises a powder delivery mechanism, a powder recoating mechanism and an irradiation beam directing mechanism.

8. The additive manufacturing apparatus of claim 1, wherein the at least one build unit comprises an irradiation beam directing mechanism translatable along an x-axis, an y-axis, or an z-axis.

9. The additive manufacturing apparatus of claim 1, wherein the build platform is a stationary build platform.

10. The additive manufacturing apparatus of claim 1, further comprising:
    a build enclosure housing the entire additive manufacturing apparatus and object to be built.

11. The additive manufacturing apparatus of claim 5, wherein the pivot joint is controlled with the movement of the build unit.

12. The additive manufacturing apparatus of claim 1, wherein a width of the first sealing member is greater than a width of the first collection arm.

* * * * *